(12) United States Patent
Faure et al.

(10) Patent No.: US 8,729,160 B2
(45) Date of Patent: May 20, 2014

(54) ADMIXTURE FOR HYDRAULIC BINDER

(75) Inventors: Jean-Michel Faure, Oullins (FR); David Rinaldi, Lyons (FR); Horacio Naranjo, Jardin (FR)

(73) Assignee: Lafarge SA, Paris (FR)

( * ) Notice: Subject to any disclaimer, the term of this patent is extended or adjusted under 35 U.S.C. 154(b) by 159 days.

(21) Appl. No.: 12/747,305

(22) PCT Filed: Dec. 12, 2008

(86) PCT No.: PCT/FR2008/001731
§ 371 (c)(1),
(2), (4) Date: Jun. 10, 2010

(87) PCT Pub. No.: WO2009/103885
PCT Pub. Date: Aug. 27, 2009

(65) Prior Publication Data
US 2010/0273916 A1    Oct. 28, 2010

(30) Foreign Application Priority Data
Dec. 14, 2007    (FR) ..................... 07 08715

(51) Int. Cl.
*C08B 31/12*    (2006.01)
*C08K 3/00*    (2006.01)

(52) U.S. Cl.
USPC .............................. 524/50; 524/5

(58) Field of Classification Search
USPC .......................................... 524/50
See application file for complete search history.

(56) References Cited

U.S. PATENT DOCUMENTS

| | | | |
|---|---|---|---|
| 3,544,344 A | 12/1970 | Pratt et al. | |
| 3,964,269 A | 6/1976 | Linstromberg | |
| 3,984,269 A | 10/1976 | Schneller et al. | |
| 4,157,264 A * | 6/1979 | Kennedy-Skipton | 524/5 |
| 4,293,344 A * | 10/1981 | Joseph | 524/5 |
| 4,661,161 A | 4/1987 | Jakacki et al. | |
| 5,478,521 A | 12/1995 | Scheiner | |
| 5,653,797 A | 8/1997 | Patel | |
| 5,725,656 A | 3/1998 | Shimanovich et al. | |
| 5,779,786 A | 7/1998 | Patel | |
| 6,228,163 B1 | 5/2001 | Espinoza et al. | |
| 6,436,185 B1 | 8/2002 | Ayambem et al. | |
| 6,645,291 B2 | 11/2003 | Ayambem et al. | |
| 6,660,799 B1 | 12/2003 | Kensicher et al. | |
| 6,805,741 B1 | 10/2004 | Liu et al. | |
| 7,256,227 B2 | 8/2007 | Stone | |
| 7,261,772 B1 | 8/2007 | Schwartz et al. | |
| 2004/0187741 A1 | 9/2004 | Liu et al. | |
| 2006/0281837 A1 | 12/2006 | Lettkeman et al. | |

FOREIGN PATENT DOCUMENTS

| | | |
|---|---|---|
| EP | 0 011 581 B1 | 6/1982 |
| EP | 681 998 B1 | 6/1998 |
| EP | 1 064 236 B1 | 8/2002 |
| EP | 1 270 530 | 1/2003 |
| EP | 1 316 537 B1 | 9/2004 |
| EP | 1 277 782 | 11/2007 |
| GB | 2 319 522 A | 5/1998 |
| GB | 2319522 A * | 5/1998 ............ C04B 28/14 |
| GB | 2 335 657 A | 9/1999 |
| WO | WO 01/81268 | 11/2001 |
| WO | WO 2004/099099 | 11/2004 |

OTHER PUBLICATIONS

International Search Report for PCT/FR2008/001731.

\* cited by examiner

*Primary Examiner* — Hui Chin
(74) *Attorney, Agent, or Firm* — Pillsbury Winthrop Shaw Pittman LLP

(57) ABSTRACT

A method includes adding at least one copolymer or a salt thereof acting as a plasticizer, blocking agent, or both a plasticizer and a blocking agent, to a calcium sulphate-based hydraulic binder. The copolymer includes an acrylic acid or a poly(oxy)alkylene copolymer.

17 Claims, 1 Drawing Sheet

ADMIXTURE FOR HYDRAULIC BINDER

CROSS-REFERENCE TO RELATED APPLICATIONS

This is the U.S. National Stage of PCT/FR2008/001731, filed Dec. 12, 2008, which in turn claims priority to French Patent Application Nos. 0708715, filed Dec. 14, 2007, the entire contents of all applications are incorporated herein by reference in their entireties.

The subject of the present invention is the use of an admixture in hydraulic binders, in particular in plaster-based or anhydrous calcium sulphate-based coatings/compounds.

The current plaster-based coatings/compounds generally contain various additives or admixtures which make it possible to control the rheology of the coating/compound and/or the setting of the coating/compound. In particular, it is advantageous for manufacturers to propose ready-to-use coatings/compounds in the form of liquid or semi-liquid slurry in which the hydration of the calcium sulphate is blocked by blocking agents. The advantage of this type of ready-to-use coating/compound is that the user does not need to mix the water and the plaster (mixing). This blocking enables the coating/compound to remain in liquid or semi-liquid slurry form and not to harden in its packaging. Thus, the user of the coating/compound will need to deblock the plaster so as to enable the uptake of moisture, by adding a deblocking agent.

However, in order for the user to be able to carry out his work under good conditions, it is necessary for the coating/compound to remain sufficiently fluid after deblocking so that it can be easily handled during the entire time that work is being carried out on the site.

However, when a blocking agent, such as acrylic acid polymers, is used, as soon as the coating/compound is deblocked by said deblocking agent, the rheology of the coating/compound is poorly controlled. Specifically, the coating/compound gradually loses its fluidity.

In order to meet user demands, it has become necessary to find another means for controlling the fluidity after deblocking of coatings/compounds based on blocked plaster.

Thus, the problem addressed by the invention is that of providing a novel admixture suitable for plasticizing and/or blocking the hydraulic binder compositions.

Unexpectedly, the inventors have demonstrated that it is possible to use acrylic acid/poly(oxy)alkylene copolymers to obtain an admixture that is of use as a plasticizer and/or blocking agent for hydraulic binders.

With this aim, the present invention proposes the use of at least one copolymer or a salt thereof as a plasticizer and/or blocking agent for calcium sulphate-based hydraulic binders, said copolymer comprising at least one unit of formula (I)

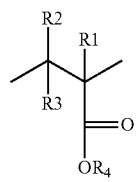

in which:
R1, R2 and R3 independently represent a hydrogen atom, a linear or branched $C_1$ to $C_{20}$ alkyl radical, or a —$(CH_2)_p$—COOR radical or an ionized form thereof, with p being equal to 0 or 1, and R is a hydrogen atom or else R is a $C_1$ to $C_6$ alkyl radical;
R4 represents a hydrogen atom, a monovalent, divalent or trivalent ion, or a quaternary ammonium radical;
and said copolymer comprising at least one unit of formula (II)

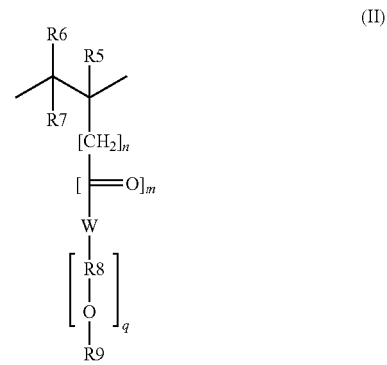

where
R5, R6 and R7 independently represent a hydrogen atom, a linear or branched $C_1$ to $C_{20}$ alkyl radical or a —$(CH_2)_n$—$(C=O)_m$—W—$(R8-O)_q$—R9 radical;
R8 represents a linear or branched $C_2$ to $C_{20}$ alkyl radical;
R9 represents a hydrogen atom, or a linear or branched $C_1$ to $C_{20}$ alkyl radical;
W represents an oxygen or nitrogen atom;
n is an integer between from 0 to 2;
m is an integer equal to 0 or 1;
q is an integer between 0 and 200;
and in which the molar mass of said copolymer is between from 500 to 18 000 daltons.

The invention also proposes a calcium sulphate-based hydraulic binder comprising at least said copolymer or a salt thereof.

Finally, the invention proposes elements for the construction field, obtained using a calcium sulphate-based hydraulic binder comprising at least said copolymer or a salt thereof.

The invention offers determining advantages; in particular, the admixture according to the invention makes it possible to block the hydration of the calcium sulphate for at least 3 months, 12 months, equally at least 18 months, or even 24 months, depending on the amount of admixture used.

Another advantage offered by the invention is that the admixture according to the invention makes it possible, by virtue of its plasticizing property, to formulate coatings/compounds using reduced amounts of water compared with the amounts conventionally used.

Another advantage of the present invention is that the admixture according to the invention can be used as a plasticizer and a blocking agent, thereby avoiding recourse to two different additives to obtain the same result. The admixture according to the invention can be described as a "2-in-1" product.

Furthermore, the admixture according to the invention has the advantage of being able to be used only as a plasticizer.

Another advantage of the present invention is that the coating/compound exhibits less change in terms of its rheology in the post-deblocking period. Normally, when using conventional deblocking agents, the user is tempted to add water to the formulation so as to keep the coating/compound fluid, thereby reducing the mechanical strength of the final product.

This is because the presence of water damages the mechanical properties of the hardened material, and may possibly cause the appearance of cracks.

Finally, the advantage of the invention is that it can be used in all industries, in particular the building industry, the chemical industry (admixture producers) and in all the construction markets (building, civil engineering or prefabrication factory), in the plaster element construction industry or the cement industry.

Other advantages and characteristics of the invention will emerge clearly on reading the description and the examples given purely by way of nonlimiting illustration, which will follow.

According to the present invention, the expression "admixture" is intended to mean any compound which, incorporated into a formulation, makes it possible to introduce particular properties.

According to the present invention, the expression "binders" is intended to mean any compound which has the property of introducing cohesion into the formulation into which it is incorporated, and which makes it possible to introduce mechanical characteristics into said formulation (for example, compression strength, tensile strength, adherence). This binder is intended to bind inert elements such as aggregates.

According to the present invention, the expression "hydraulic binders" is intended to mean any compound which has the property of becoming hydrated in the presence of water and the hydration of which makes it possible to obtain a solid with mechanical characteristics. The expression "hydraulic binder" also denotes hydric binders.

According to the present invention, the expression "setting" is intended to mean the change to the solid state by chemical reaction.

According to the present invention, the expression "coating/compound" is intended to mean a semi-fluid formulation which, after use, will acquire mechanical properties. By way of example of a coating/compound, mention may be made of coatings/compounds for filling, for pointing of joints or grouting, for smoothing or for finishing.

According to the present invention, the expression "blocking agent" is intended to mean any admixture which makes it possible to prevent the setting of any hydraulic binders.

According to the present invention, the expression "deblocking agent" is intended to mean any admixture which makes it possible to suppress the blocking action of the blocking agent. By way of deblocking agent suitable according to the invention, mention may be made of aluminium sulphate, sulphuric acid, hydrochloric acid, sodium hydrogen sulphate, potassium hydrogen sulphate, aluminium potassium sulphate and calcium sulphate dihydrate, and mixtures thereof.

According to the present invention, the expression "plasticizer" is intended to mean any admixture which makes it possible to plasticize.

According to the present invention, the expression "elements for the construction field" is intended to mean any element forming a construction, for instance a floor, a wall, a partition, a ceiling, a beam, a work-top or a cornice.

The invention relates to the use of at least one copolymer or a salt thereof as a plasticizer and/or blocking agent for calcium sulphate-based hydraulic binders, said copolymer comprising at least one unit of formula (I)

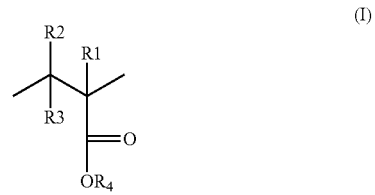

in which:
R1, R2 and R3 independently represent a hydrogen atom, a linear or branched $C_1$ to $C_{20}$ alkyl radical, or a —$(CH_2)_p$—COOR radical or an ionized form thereof, with p being equal to 0 or 1, and R is a hydrogen atom or else R is a $C_1$ to $C_6$ alkyl radical;
R4 represents a hydrogen atom, a monovalent, divalent or trivalent ion, or a quaternary ammonium radical;
and said copolymer comprising at least one unit of formula (II)

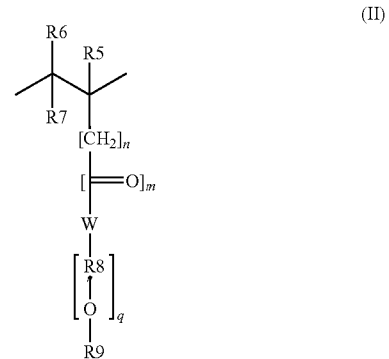

where
R5, R6 and R7 independently represent a hydrogen atom, a linear or branched $C_1$ to $C_{20}$ alkyl radical or a —$(CH_2)_n$—$(C=O)_m$—W—$(R8-O)_q$—R9 radical;
R8 represents a linear or branched $C_2$ to $C_{20}$ alkyl radical;
R9 represents a hydrogen atom, or a linear or branched $C_1$ to $C_{20}$ alkyl radical;
W represents an oxygen or nitrogen atom;
n is an integer between from 0 to 2;
m is an integer equal to 0 or 1;
q is an integer between 0 and 200;
and in which the molar mass of said copolymer is between from 500 to 18 000 daltons.

Preferably, the copolymer according to the invention or a salt thereof has an R1 radical representing a hydrogen atom.
Preferably, the copolymer according to the invention or a salt thereof has an R2 radical representing a hydrogen atom.
Preferably, the copolymer according to the invention or a salt thereof has an R3 radical representing a hydrogen atom.
Preferably, the copolymer according to the invention or a salt thereof has an R4 radical representing a hydrogen atom.
Preferably, the copolymer according to the invention or a salt thereof has an R5 radical representing a hydrogen atom.
Preferably, the copolymer according to the invention or a salt thereof has an R6 radical representing a hydrogen atom.
Preferably, the copolymer according to the invention or a salt thereof has an R7 radical representing a hydrogen atom.
Preferably, the copolymer according to the invention or a salt thereof has an atom W representing an oxygen atom.

Preferably, the copolymer according to the invention or a salt thereof has an R8 radical representing a $C_2$ alkyl radical.

Preferably, the copolymer according to the invention or a salt thereof has an R9 radical representing a $C_1$ alkyl radical or a hydrogen atom.

Preferably, the copolymer according to the invention or a salt thereof has an integer q between 2 and 30, preferably between from 4 to 25.

The copolymer according to the invention or a salt thereof can be used as a plasticizer and/or blocking agent.

In particular, the copolymer according to the invention or a salt thereof can be used to block a hydraulic binder, in particular plaster-based coatings/compounds.

More particularly, the copolymer according to the invention will make it possible to formulate coatings/compounds containing less water and to control the fluidity of said coating/compound after deblocking.

Even more particularly, the copolymer according to the invention or a salt thereof is most particularly suitable for blocking or for controlling the fluidity of ready-blocked plaster-based coatings/compounds.

In particular, the copolymer according to the invention or a salt thereof can be used as an admixture for hydraulic binders chosen from plasters, cements, mortars, concretes or binders based on anhydrous calcium sulphate. Among the calcium sulphate-based hydraulic binders, plasters based on calcium sulphate hemihydrate ($\alpha$ or $\beta$) are most particularly suitable according to the invention, or binders based on anhydrous calcium sulphate.

The copolymer according to the invention or salts thereof can have a varied chemical structure. In particular, the distribution of the units (I) and (II) within the copolymer can vary from one molecule to another. In particular, the copolymer according to the invention may have a block, random, alternating or gradient structure.

According to the invention, the term "block structure" is intended to mean a structure comprising distinct blocks of each of the monomer units.

According to the invention, the term "random structure" is intended to mean a structure comprising the monomer units distributed statistically or randomly in the polymer chain.

According to the invention, the term "alternating structure" is intended to mean a structure in which the monomer units alternate in the polymer chain.

According to the invention, the term "gradient structure" is intended to mean a structure in which the concentration of each monomer unit varies in a manner inversely proportional to one another.

Preferably, the copolymer according to the invention will have a random or gradient structure.

Preferably, the relative proportions of each unit (I) or (II) in the copolymer can range from 1/99 to 99/1 with respect to the proportion of individual units.

Preferably, the relative proportion of unit (I) with respect to unit (II) is between from 70/30 to 99/1.

More preferably, the relative proportion of unit (I) with respect to unit (II) is between from 80/20 to 98/2.

Even more preferably, the relative proportion of unit (I) with respect to unit (II) is between from 85/15 to 97/3.

The copolymer according to the invention or salts thereof has (have) a molar mass between from 500 to 18 000 daltons, more particularly between from 1000 to 16 000 daltons, preferably between from 1500 to 15 000 daltons, more preferably between from 2000 to 10 000, even more preferably from 2000 to 6000 daltons.

The copolymer according to the invention may be completely or partially in the form of salts or in acid form. The salts or the ions that are suitable according to the invention may be chosen from the metals as described in the periodic table of elements, in particular the alkali metals or the alkaline-earth metals. Other metals, such as the transition metals, may also be suitable.

The copolymers are obtained by copolymerization, preferably free-radical copolymerization, of appropriate monomers. The copolymerization can be carried out in a manner that is conventional for those skilled in the art.

Preferably, the copolymer according to the invention is prepared from an acrylic acid monomer.

Preferably, the copolymer according to the invention is prepared from a monomer having the following formula:

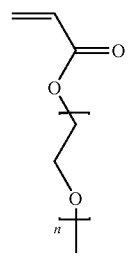

Even more preferably, the copolymer according to the invention is prepared from a monomer having the following formula:

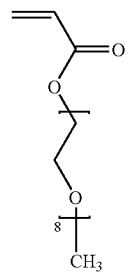

The concentration of copolymer according to the invention in the formulation depends on the intended application. The copolymer according to the invention can be used in the form of a liquid solution, for example an aqueous solution, in the form of a dispersion, or else in the form of a powder. Preferably, the copolymer according to the invention or a salt thereof will be used at a concentration between from 0.01% to 10%, preferably from 0.1% to 5%, even more preferably from 0.2% to 2% by dry weight of copolymer relative to the dry weight of hydraulic binder.

Finally, the copolymer formulated may be used alone or in combination with one or more other admixtures, such as an accelerator, a retarder, a thickener, a rheological agent or, optionally, another dispersant, in order to adjust the rheological and setting properties of the material.

A subject of the invention is also a calcium sulphate-based hydraulic binder comprising at least one copolymer or a salt thereof according to the invention, said copolymer comprising at least one unit of formula (I)

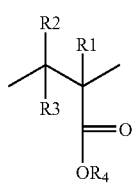

(I)

in which:

R1, R2 and R3 independently represent a hydrogen atom, a linear or branched $C_1$ to $C_{20}$ alkyl radical, or a —$(CH_2)_p$—COOR radical or an ionized form thereof, with p being equal to 0 or 1, and R is a hydrogen atom or else R is a $C_1$ to $C_6$ alkyl radical;

R4 represents a hydrogen atom, a monovalent, divalent or trivalent ion, or a quaternary ammonium radical;

and said copolymer comprising at least one unit of formula (II)

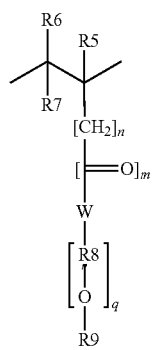

(II)

where

R5, R6 and R7 independently represent a hydrogen atom, a linear or branched $C_1$ to $C_{20}$ alkyl radical or a —$(CH_2)_n$—$(C=O)_m$—W—$(R8-O)_q$—R9 radical;

R8 represents a linear or branched $C_2$ to $C_{20}$ alkyl radical;

R9 represents a hydrogen atom, or a linear or branched $C_1$ to $C_{20}$ alkyl radical;

W represents an oxygen or nitrogen atom;

n is an integer between from 0 to 2;

m is an integer equal to 0 or 1;

q is an integer between 0 and 200;

and in which the molar mass of said copolymer is between from 500 to 18 000 daltons.

The copolymer according to the invention or a salt thereof can be incorporated into the hydraulic binder in the form of a liquid solution, in the form of a dispersion, or else in the form of a powder.

The hydraulic binder according to the invention can be used for manufacturing elements for the construction field, in particular for any element forming a construction, for instance a floor, a wall, a partition, a ceiling, a beam, a cornice or a work-top.

The concentration of copolymer according to the invention in the coating/compound depends on the intended application. Preferably, the copolymer according to the invention or a salt thereof will be used at a concentration between from 0.05% to 5%, preferably from 0.05% to 2% by weight of copolymer relative to the weight of the coating/compound.

Another subject of the invention is also elements for the construction field, obtained using a calcium sulphate-based hydraulic binder comprising at least one copolymer or a salt thereof, said copolymer comprising at least one unit of formula (I)

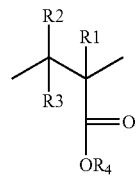

(I)

in which:

R1, R2 and R3 independently represent a hydrogen atom, a linear or branched $C_1$ to $C_{20}$ alkyl radical, or a —$(CH_2)_p$—COOR radical or an ionized form thereof, with p being equal to 0 or 1, and R is a hydrogen atom or else R is a $C_1$ to $C_6$ alkyl radical;

R4 represents a hydrogen atom, a monovalent, divalent or trivalent ion, or a quaternary ammonium radical;

and said copolymer comprising at least one unit of formula (II)

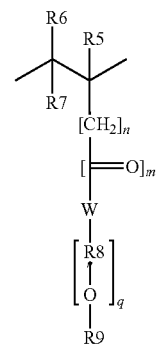

(II)

where

R5, R6 and R7 independently represent a hydrogen atom, a linear or branched $C_1$ to $C_{20}$ alkyl radical or a —$(CH_2)_n$—$(C=O)_m$—W—$(R8-O)_q$—R9 radical;

R8 represents a linear or branched $C_2$ to $C_{20}$ alkyl radical;

R9 represents a hydrogen atom, or a linear or branched $C_1$ to $C_{20}$ alkyl radical;

W represents an oxygen or nitrogen atom;

n is an integer between from 0 to 2;

m is an integer equal to 0 or 1;

q is an integer between 0 and 200;

and in which the molar mass of said copolymer is between from 500 to 18 000 daltons.

Figure 1:
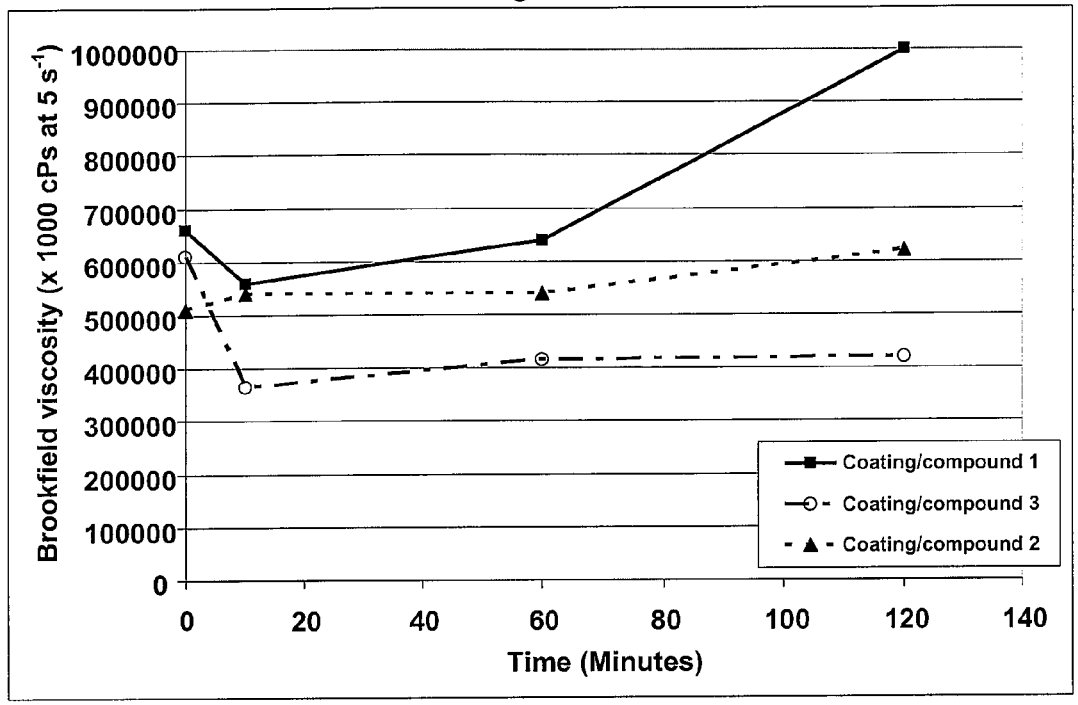
FIG. 1 represents the viscosity of three coatings/compounds, with or without copolymer according to the invention, as a function of time.

The following examples illustrate the invention without limiting the scope thereof.

EXAMPLES

Example 1

Synthesis of a Copolymer Based on an Acrylic-Type Macromonomer-Copolymer 1

Water (141.7 g) and thioglycolic acid (3.79 g) are successively weighed out into a 1000 mL jacketed reactor. A reaction assembly is formed which comprises a mechanical stirrer, a condenser, a nitrogen inlet and a temperature probe. The reaction medium is degassed under nitrogen and is heated to 85° C. by means of the jacket. After the set temperature has been reached and there has been sufficient degassing (approximately 15 minutes), the three solutions below are added gradually over 1 h30:

7.14 g vazo68WSP (thermal initiator from Dupont) in 52.22 g of NaOH 1M;
9.47 g of thioglycolic acid in 14.93 g of water;
39.2 g of AMPEG450 (from ALDRICH) in 225 g of water and 118.1 g of acrylic acid.

The reaction medium is left to react for a further 30 minutes after the introduction of all the reactants. The copolymer solution thus obtained is left to cool and then neutralized with 61.2 g of NaOH pellets. A clear colourless aqueous solution is obtained, the pH of which is equal to 6.

The molar mass by weight of the copolymer obtained is 3000 daltons (Mw). It was evaluated by aqueous-phase size exclusion chromatography (SEC) using pAANa calibration. The copolymer contains, on average, 95% of acrylic acid units and 5% of AMPEG450 units.

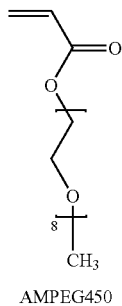

AMPEG450

Example 2

Synthesis of a Copolymer Based on an Allyl-Type Macromonomer-Copolymer 2

Water (160 g), a methoxy polyethylene glycol allyl macromonomer (33.4 g, AM1100 from Clariant), acrylic acid (8.3 g) and thioglycolic acid (1.58 g) are successively weighed out into a 500 mL four-necked round-bottomed flask. A reaction assembly is formed which comprises a magnetic stirrer, a condenser, a nitrogen blowpipe and a temperature probe. The reaction medium is heated to 85° C. and, after sufficient degassing of the medium (approximately 15 minutes) with nitrogen, a thermal initiator is added (2.61 g of Vazo 68WSP from Dupont). A solution of 33.3 g of acrylic acid, 131.5 g of water and 1.83 g of thioglycolic acid is then gradually added for 60 minutes. After addition of the reactants, the medium is left to react further for an additional one hour. A slightly cloudy colourless solution is obtained, the pH of which is equal to 2.

The molar mass by weight of the copolymer obtained is 3000 daltons (Mw). It was evaluated by aqueous size exclusion chromatography (SEC) using pAANa calibration. The copolymer contains, on average, 95% of acrylic acid units and 5% of AllylM1100 units.

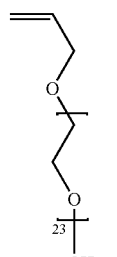

AllylM1100

Example 3

Evaluation of the Blocking and Plasticizing Effect of Copolymers 1 and 2 on a Liquid Slurry of Calcium Sulphate Hemihydrate The blocking and plasticizing effects of copolymers 1 and 2 are evaluated on a liquid slurry of calcium sulphate hemihydrate mixed at a water/powder ratio (W/P=0.60). The fluidity of the liquid slurry is evaluated by means of the "spread ring" test. A cylinder (also called spread ring) of well-defined size (width 30 mm-height 50 mm) is positioned on the work-top in such a way that the volume defined by the interior of the cylinder and the work-top forms a cavity. This cavity is completely filled with liquid slurry to be tested. The cylinder is then carefully raised. The liquid slurry to be tested then spreads on the work-top. The surface area covered by the spreading of the liquid slurry to be tested is determined. The blocking time is evaluated visually. The plaster is a SELECTA β plaster of natural origin. The copolymers derived from examples 1 and 2 are tested in comparison with an acrylic acid homopolymer (Fl1000a produced by the company SNF Floerger). The molar mass by weight of this homopolymer is 3000 daltons (Mw) and was evaluated by aqueous SEC using pAANa calibration.

Copolymers 1 and 2 are compared to a conventional blocking agent: an acrylic acid homopolymer.

The tests were carried out at a dosage of dry copolymer or homopolymer of 0.25% relative to the dry weight of calcium sulphate hemihydrate. The results are recorded in table I below.

TABLE I

| Reference | Spread (mm) |
| --- | --- |
| Copolymer 1 | 125 |
| Copolymer 2 | 120 |
| Fl1000a | 60 |
| Fl1000a + plasticizer (Ethacryl M from Lyondell) | 60 |

The results show a better spread of the liquid slurry in the presence of the copolymers according to the invention compared with the acrylic acid homopolymer, optionally supplemented with a plasticizer. The liquid slurry is clearly more fluid using copolymers 1 and 2.

In all cases, these calcium sulphate hemihydrate slurries have not after three months.

Example 4

Evaluation of the Blocking and Plasticizing Effect of Copolymer 1 on a Coating/Compound Based on Calcium Sulphate Hemihydrate The blocking and plasticizing effects of copolymer 1 are evaluated on coatings/compounds based on calcium sulphate hemihydrate. Various coatings/compounds are produced using copolymer 1 and an acrylic acid homopolymer (Fl1000a produced by the company SNF Floerger) optionally in combination with a plasticizer Ethacryl M (from Lyondell).

The various coatings/compounds prepared (see table II) have not set after three months.

Figure 2:
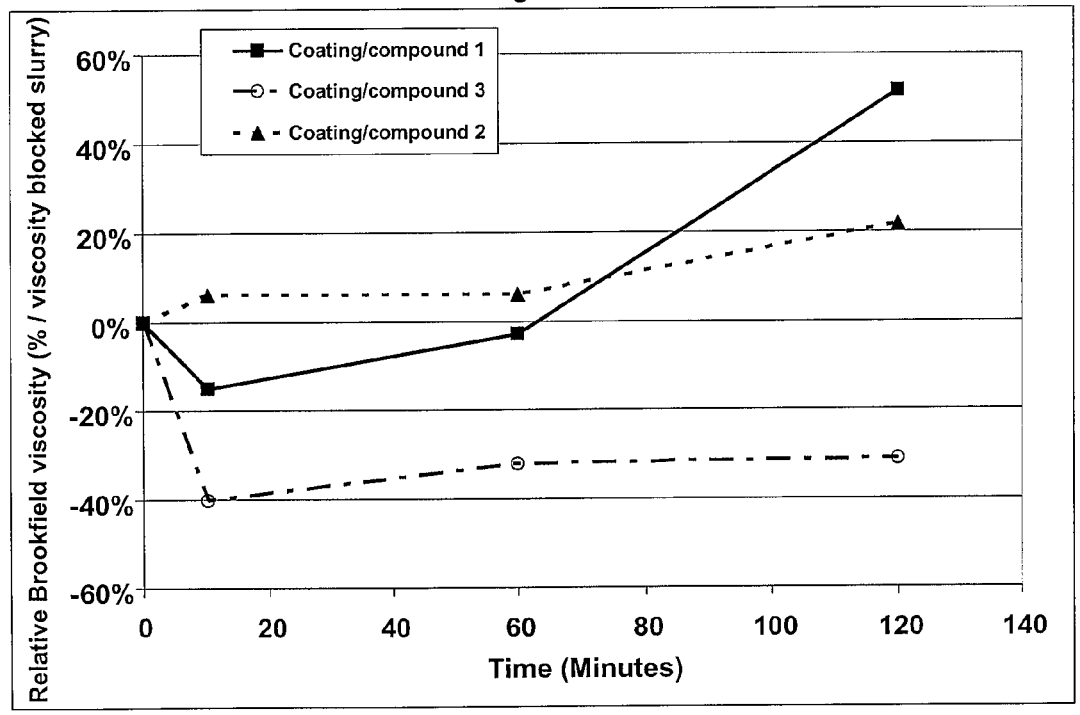
FIG. 2 shows the relative viscosity of three coatings/compounds, with or without copolymer according to the invention, as a function of time.

A solution of aluminium sulphate hexadecahydrate (Sigma) is added to each of the coatings/compounds in order to deblock the coatings/compounds (2.56 g of solution per 100 g of blocked slurry). The viscosity of the coating/compound is measured using a Brookfield viscometer fitted with spindle D, at a speed of $2.5\ s^{-1}$. The measurements are taken on the blocked slurry (T0), and then over time, after deblocking for two hours. Table III and FIGS. 1 and 2 give the values and the changes in viscosity obtained using these three coatings/compounds.

TABLE II

|  |  | Dry extract | Coating/compound 1 % m/m | Coating/compound 2 % m/m | Coating/compound 3 % m/m |
| --- | --- | --- | --- | --- | --- |
| Water | Tap water | 100% | 26.20% | 24.03% | 26.19% |
| Antifoam | clerol NXZ | 100% | 0.06% | 0.06% | 0.06% |
| Plaster | SH natural Beta | 100% | 25.09% | 25.60% | 25.08% |
| Limestone filler | mikhart 15 | 100% | 39.37% | 40.18% | 39.35% |
| Mica | MU 247 | 100% | 1.47% | 1.50% | 1.46% |
| Talc | Luzenac talc | 100% | 2.74% | 2.79% | 2.73% |
| Polymer | Poval 217S | 100% | 0.34% | 0.35% | 0.34% |
| Thickener | MHPC 20000P | 100% | 0.42% | 0.43% | 0.42% |
| Biocide | Acticide MBS | 100% | 0.30% | 0.31% | 0.30% |
| Binder | Airflex EP17 | 50% | 3.54% | 3.61% | 3.54% |
| Blocking agent | Fl1000A | 53.10% | 0.47% |  | 0.47% |
| Blocking agent/plasticizer | Copolymer 1 | 22.28% |  | 1.15% |  |
| Superplasticizer | Ethacryl |  |  |  | 0.05% |
|  |  |  | 100.00% | 100.00% | 100.00% |

TABLE III

|  |  | Blocked coating/compound | Deblocked slurry | | |
| --- | --- | --- | --- | --- | --- |
|  |  | Viscosity (cPs) T0 | Viscosity (cPs) T = 10' | Viscosity (cPs) T = 60' | Viscosity (cPs) T = 120' |
| Coating/compound 1 | Time (Minutes) | 0 | 10 | 60 | 120 |
|  | Viscosity (×1000 cPs) | 660000 | 560000 | 640000 | 1000000 |
|  | Viscosity/viscosity blocked slurry (%) | 0% | −15.2% | −3.0% | 51.5% |
| Coating/compound 2 | Viscosity (×1000 cPs) | 510000 | 540000 | 540000 | 620000 |
|  | Viscosity/viscosity blocked slurry (%) | 0% | 5.9% | 5.9% | 21.6% |
| Coating/compound 3 | Viscosity (×1000 cPs) | 610000 | 365000 | 415000 | 420000 |
|  | Viscosity/viscosity blocked slurry (%) | 0% | −40.2% | −32.0% | −31.1% |

The analysis of the viscosity measurements obtained on the coating/compound prepared with copolymer 1 (coating/compound 2) show a very small change over the two hours (120 minutes) which follow the deblocking with the aluminium sulphate solution, in comparison with those measured on the coating/compound with the acrylic homopolymer alone (coating/compound 1) which exhibit a very large change after one hour, or those measured on the coating/compound prepared with the acrylic homopolymer combined with a plasticizer (coating/compound 3), which show a drastic drop in viscosity just after the deblocking with the aluminium sulphate solution.

The invention claimed is:
1. A method comprising: adding at least one copolymer or a salt thereof acting as a plasticizer and a blocking agent to a calcium sulphate-based hydraulic binder,
said copolymer comprising at least one unit of formula (I)

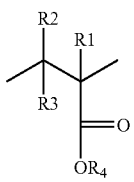

(I)

in which:
R1, R2 and R3 independently represent a hydrogen atom, a linear or branched $C_1$ to $C_{20}$ alkyl radical, or a —$(CH_2)_p$—COOR radical or an ionized form thereof, with p being equal to 0 or 1, and R is a hydrogen atom or R is a $C_1$ to $C_6$ alkyl radical;
R4 represents a hydrogen atom, a monovalent, divalent or trivalent ion, or a quaternary ammonium radical;
and said copolymer comprising at least one unit of formula (II)

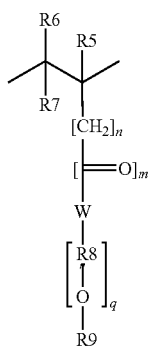

(II)

where
R5, R6 and R7 independently represent a hydrogen atom, a linear or branched $C_1$ to $C_{20}$ alkyl radical or a —$(CH_2)_n$—$(C=O)_m$—W—$(R8-O)_q$—R9 radical;
R8 represents a linear or branched $C_2$ to $C_{20}$ alkyl radical;
R9 represents a hydrogen atom, or a linear or branched $C_1$ to $C_{20}$ alkyl radical;
W represents an oxygen or nitrogen atom;
n is an integer from 0 to 2;
m is an integer equal to 0 or 1;
q is an integer from 2 to 30;
and in which the molar mass of said copolymer is from 500 to 18 000 daltons,
wherein a relative proportion of unit of formula (I) with respect to unit of formula (II) is from 70/30 to 99/1.

2. The method of claim 1, wherein said copolymer or a salt thereof is added to the calcium sulphate-based hydraulic binder chosen from a plaster based on calcium sulphate hemihydrate (α or β) or a binder based on anhydrous calcium sulphate.

3. The method of claim 1, wherein said copolymer or a salt thereof has a block, random, alternating or gradient structure.

4. The method of claim 1, wherein said copolymer or a salt thereof has a molar mass that is from 1000 to 16 000 daltons.

5. The method of claim 1, wherein said copolymer has an R1 radical representing a hydrogen atom.

6. The method of claim 1, wherein said copolymer has an R2 radical representing a hydrogen atom.

7. The method of claim 1, wherein said copolymer has an R3 radical representing a hydrogen atom.

8. The method of claim 1, wherein said copolymer has an R4 radical representing a hydrogen atom.

9. The method of claim 1, wherein said copolymer has an R5 radical representing a hydrogen atom.

10. The method of claim 1, wherein said copolymer has an R6 radical representing a hydrogen atom.

11. The method of claim 1, wherein said copolymer has an R7 radical representing a hydrogen atom.

12. The method of claim 1, wherein W represents an oxygen atom.

13. The method of claim 1, wherein said copolymer has an R8 radical representing a $C_2$ alkyl radical.

14. The method of claim 1, wherein said copolymer has an R9 radical representing a $C_1$ alkyl radical or a hydrogen atom.

15. The method of claim 1, wherein q is an integer from 4 to 25.

16. The method of claim 1, wherein a concentration of the at least one copolymer or a salt thereof is from 0.01% to 10% by dry weight of the copolymer of salt thereof relative to a dry weight of the calcium sulphate-based hydraulic binder.

17. The method of claim 1, wherein the at least one copolymer or a salt thereof is added to the calcium sulphate-based hydraulic binder with one or more admixtures selected from the group consisting of an accelerator, a retarder, a thickener, a rheological agent, a dispersant and any combination thereof.

* * * * *